(12) United States Patent
Glass

(10) Patent No.: US 7,954,503 B2
(45) Date of Patent: Jun. 7, 2011

(54) DUAL PURPOSE PORTABLE APPARATUS FOR CARRYING HARVESTED GAME AND PROVIDING SHELTER FOR A HUNTER

(76) Inventor: Steven W. Glass, Oklahoma City, OK (US)

( * ) Notice: Subject to any disclaimer, the term of this patent is extended or adjusted under 35 U.S.C. 154(b) by 433 days.

(21) Appl. No.: 12/217,226

(22) Filed: Jul. 2, 2008

(65) Prior Publication Data

US 2009/0032562 A1 Feb. 5, 2009

Related U.S. Application Data

(60) Provisional application No. 60/962,914, filed on Aug. 1, 2007, provisional application No. 60/009,112, filed on Dec. 26, 2007.

(51) Int. Cl.
 *E04H 15/30* (2006.01)
 *E04H 15/02* (2006.01)
(52) U.S. Cl. ............................................ 135/95; 135/96
(58) Field of Classification Search ..................... 135/95, 135/96, 901; 383/41; 119/843, 712, 416, 119/496, 726, 816; 224/923, 921, 577, 191, 224/154, 157, 158, 184; 280/18; 2/69.5, 2/456
See application file for complete search history.

(56) References Cited

U.S. PATENT DOCUMENTS

| 3,150,640 | A | * | 9/1964 | Nevitt ........................... 119/712 |
| 5,257,427 | A | * | 11/1993 | Hinshaw .......................... 5/613 |
| 5,761,992 | A | | 6/1998 | Gallo |
| 5,836,812 | A | | 11/1998 | Brackett |
| 6,135,333 | A | | 10/2000 | Tucker et al. |
| 6,253,569 | B1 | | 7/2001 | Hall |
| 6,276,698 | B1 | | 8/2001 | Calandra |
| 6,510,705 | B1 | | 1/2003 | Jackson |
| 7,051,387 | B1 | | 5/2006 | Yoder et al. |
| 7,634,919 | B2 | * | 12/2009 | Bernhard et al. ............... 62/371 |
| 2003/0235605 | A1 | * | 12/2003 | Lelah et al. .................. 424/443 |

* cited by examiner

*Primary Examiner* — David Dunn
*Assistant Examiner* — Danielle Jackson
(74) *Attorney, Agent, or Firm* — Dunlap Codding, P.C.

(57) ABSTRACT

A dual purpose portable apparatus is provided for carrying a harvested game animal or for providing a protective shelter for a person. The apparatus includes a housing formed of a flexible, foldable material defining a chamber therein, the chamber adapted to receive a body and head portion of the harvested game animal or the person seeking shelter therein. Openings are provided for receiving the hind and fore legs of the harvested game animal and a gap formed in a forward end of the housing allows for passage of the antlers. Edges of the housing are disposed above the openings when the housing is in a closed configuration so as to substantially retard leakage of fluid through the openings and between the edges of the housing.

25 Claims, 10 Drawing Sheets

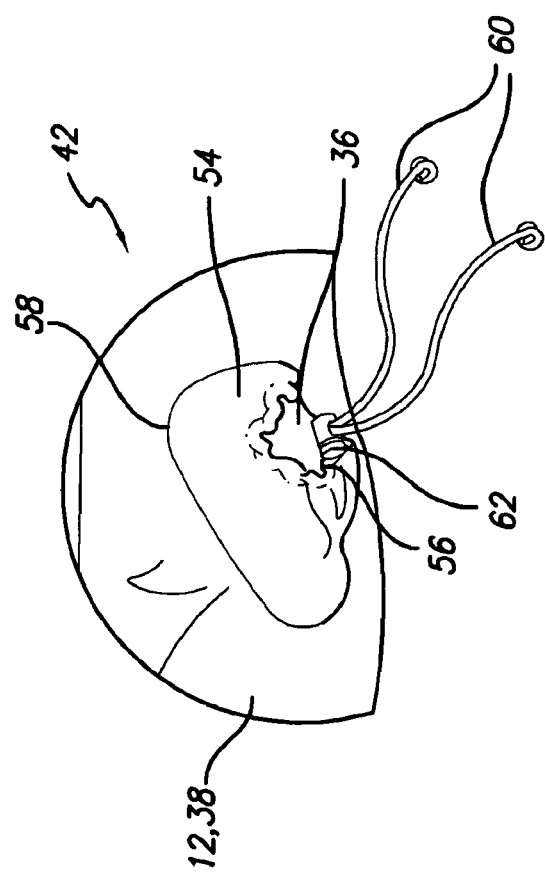
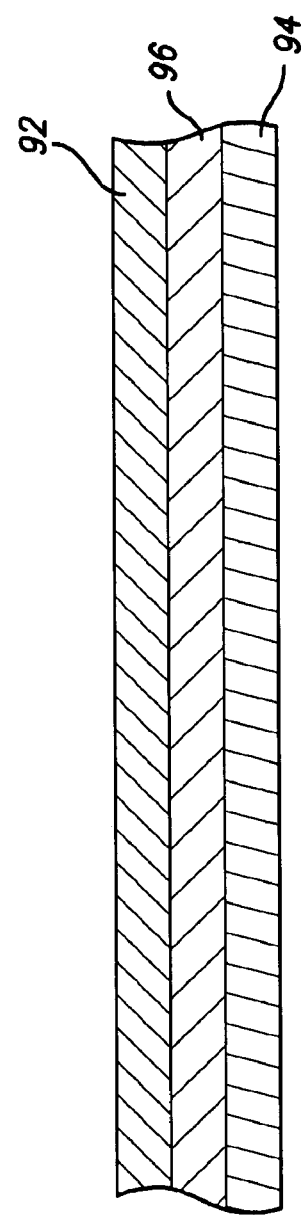
FIG. 4
FIG. 5

DUAL PURPOSE PORTABLE APPARATUS FOR CARRYING HARVESTED GAME AND PROVIDING SHELTER FOR A HUNTER

CROSS REFERENCE TO RELATED APPLICATIONS

This application is related to U.S. Provisional Patent Application Ser. No. 60/962,914 entitled "Portable Storage Unit for Carrying Harvested Game," filed Aug. 1, 2007; and is also related to U.S. Provisional Patent Application Ser. No. 61/009,112 entitled "Portable Housing for Carrying Harvested Game," filed Dec. 26, 2007.

BACKGROUND

1. Field of the Invention

The present invention relates to an apparatus for collecting and carrying harvested game and for providing a protective shelter for a person encountering inclement weather during a hunting trip.

2. Background of the Invention

Millions of people in the United States and abroad hunt wild game, such as deer, antelope, elk, wild hogs and turkeys. Often the hunting is carried out in mountainous or similar terrain. Once an animal has been successfully harvested, the majority of hunters transport the animal out of the wild where it can be processed, both for its meat and as a trophy. During the hunting trip the hunter often encounters inclement weather which prevents the hunter from rapidly descending rugged terrain and the like. In such instances, the hunter may be in need of a protective shelter to prevent hypothermia and/or to provide protection from the elements such as snow, and rain, until such time as the weather sufficiently clears to allow the hunter to descend safely.

Consequentially, there is a need for an apparatus to aid hunters in transporting harvested game while maintaining the integrity of both the animal's meat and the potential use of the animal's head as a trophy, and at the same time providing the hunter with a shelter should inclement weather be encountered. The present invention is directed to address these needs.

SUMMARY OF THE INVENTION

A dual purpose portable apparatus is provided for carrying a harvested game animal or for providing a protective shelter for a person. The apparatus includes a housing formed of a flexible, foldable material defining a chamber therein. The chamber is adapted to receive a body and a head portion of the harvested game animal or the person seeking shelter therein. The housing includes a first edge portion and a second edge portion. The first edge portion is disposable a distance from the second edge portion when the housing is in an open configuration for receiving the harvested game animal or the person. The first edge portion is disposable adjacent and connectable to the second edge portion for enclosing at least a portion of the chamber in a closed configuration when the harvested game animal is disposed therein or the person is positioned therein. A first opening is positioned near a rearward end portion of the housing and is adapted to receive the hind legs of the harvested game animal when the harvested game animal is positioned in the chamber of the housing. A second opening is positioned near a forward end of the housing and is adapted to receive the fore legs of the harvested game animal when the harvested game animal is positioned in the chamber of the housing. The first and second edges of the housing are disposed above the first and second openings therein when the housing is in a closed configuration so as to substantially retard leakage of fluid through the first and second openings and between the first and second edges of the housing. A recess in a forward end of at least one or both of the first and second edges forms a forward gap in a forward end of the housing when the housing is in the closed configuration. The forward gap allows for protrusion of antlers on the head of the harvested game animal when the harvested game animal is positioned in the chamber of the housing and the housing is in a closed configuration. At least one flap having a first end and a second end is provided, wherein the first end is connected to the forward end of the housing and whereby the at least one flap is capable of covering the forward gap.

BRIEF DESCRIPTION OF THE DRAWINGS

FIG. 4 is a segment of the dual purpose portable apparatus of FIG. 3 indicated by the encircled portion.

FIG. 5 is a segmental, cross-sectional view of the dual purpose portable apparatus of FIG. 3 taking along lines 5-5 thereof.

DETAILED DESCRIPTION OF EXEMPLARY EMBODIMENTS

Figure 1:
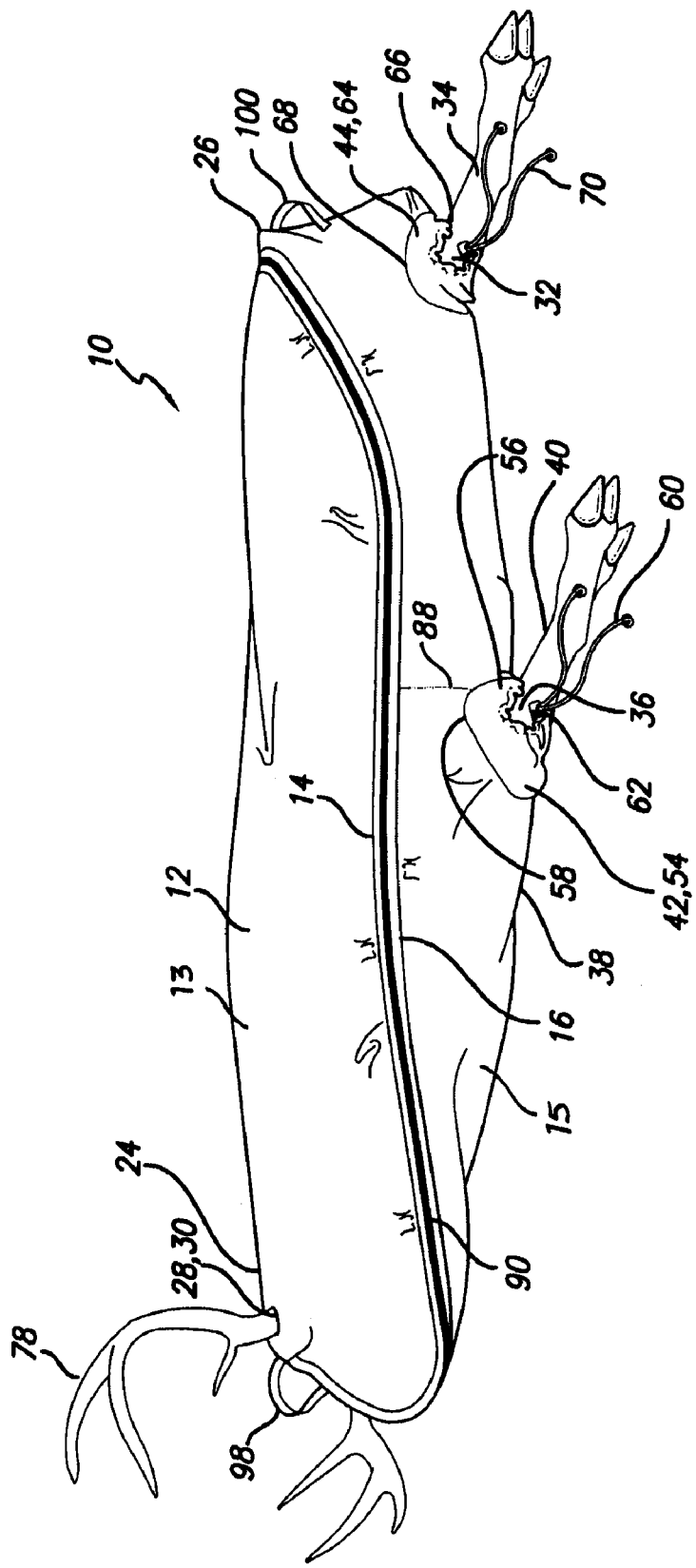
FIG. 1 is a pictorial representation of a dual purpose portable apparatus constructed in accordance with the present invention, the dual purpose portable apparatus in a closed configuration and having a harvested deer positioned therein.
Figure 2:
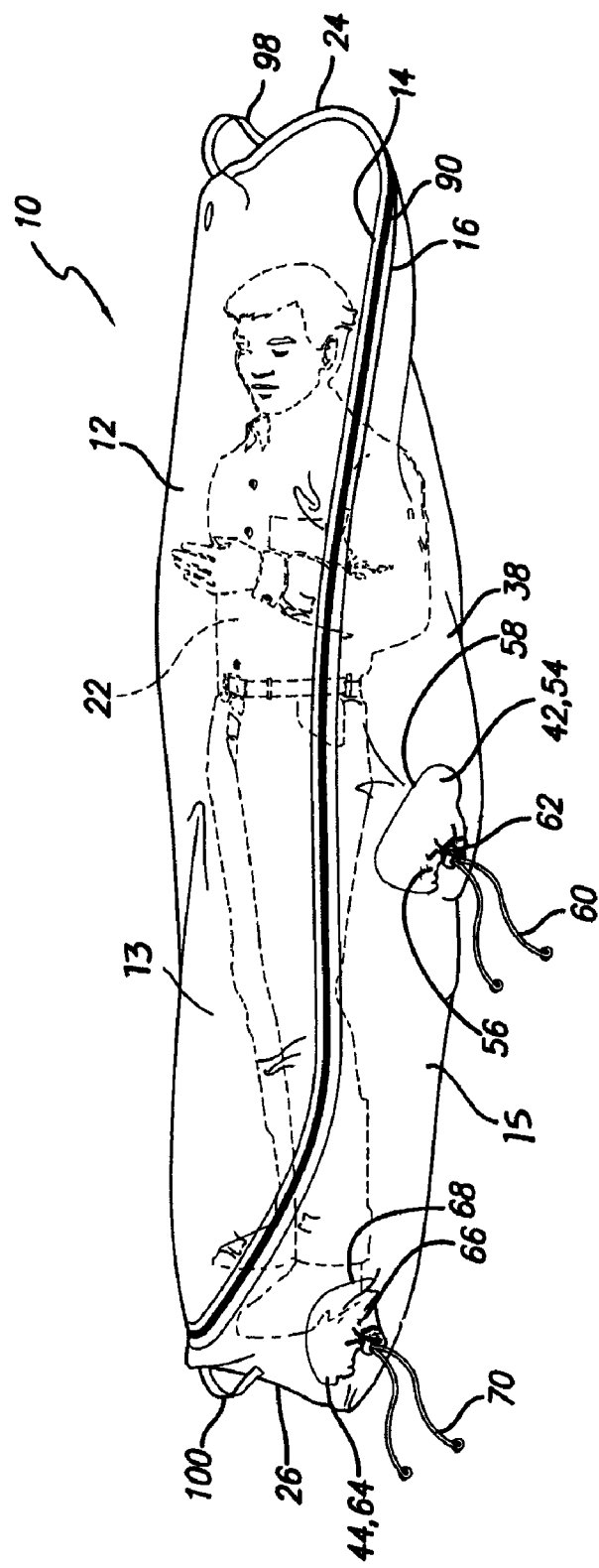
FIG. 2 is a pictorial representation of the dual purpose portable apparatus constructed in accordance with the present invention, the dual purpose portable apparatus functioning as a shelter for a person, the person being shown in phantom.
Figure 3:
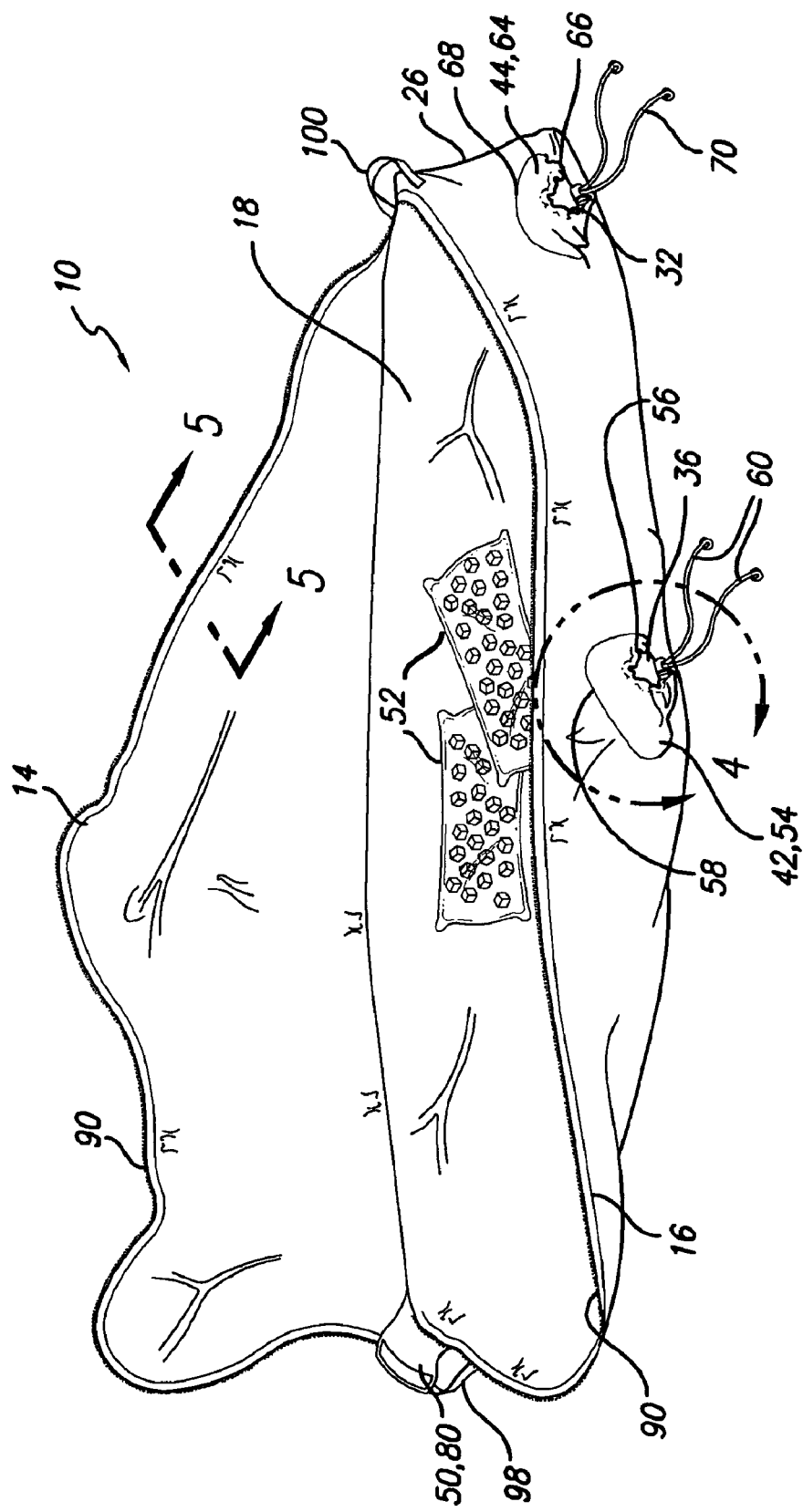
FIG. 3 is a pictorial representation of the dual purpose portable apparatus of the present invention in an open configuration for receiving a harvested game animal, packaged ice being illustrated in an interior chamber of the dual purpose portable apparatus for cooling the harvested game animal when enclosed within the dual purpose portable apparatus.

Presently preferred embodiments of the invention are shown in the above-identified Figures and are described in detail hereinafter. In describing the preferred embodiments, like or identical reference numerals are used to identify common or similar elements. The Figures are not necessarily to scale and certain features and certain views of the figures may be exaggerated in scale or in schematic in the interest of clarity and conciseness. Referring now to the drawings and more particularly to FIG. 1, shown therein and designated by the reference numeral 10 is a dual purpose, portable apparatus constructed in accordance with the present invention. The dual purpose portable apparatus 10 includes a housing 12 having a first side 13 with a first edge portion 14, a second side 15 with a second edge portion 16 and a chamber formed within the housing 12 when the first and second edge portions 14 and 16 are disposed adjacent and secured to one another substantially as shown in FIG. 1. However, when the first and second edge portions 14 and 16 are disposed a distance apart substantially as shown in FIG. 3, the chamber 18 formed in the housing 12 is sized to receive a harvested game animal, such as a deer 20 (FIG. 6) or a person 22 (FIG. 2) utilizing the dual purpose portable apparatus 10 as a shelter when encountering inclement weather and the person is unable to descend to safety for a period of time. While the dual purpose portable apparatus 10 is shown in FIG. 2 as being used as a survival bag, it should be understood that the dual purpose portable apparatus 10 can be used in the construction of a lean-to or other types of shelter to protect a person from the elements such as snow, rain or the like, or as an insulating ground cover. While the Figures and description refer to a harvested deer, it is understood that any harvested game animal, including but not limited to deer, antelope, elk, wild hogs and turkeys can be carried in the dual purpose portable apparatus 10.

Figure 6:
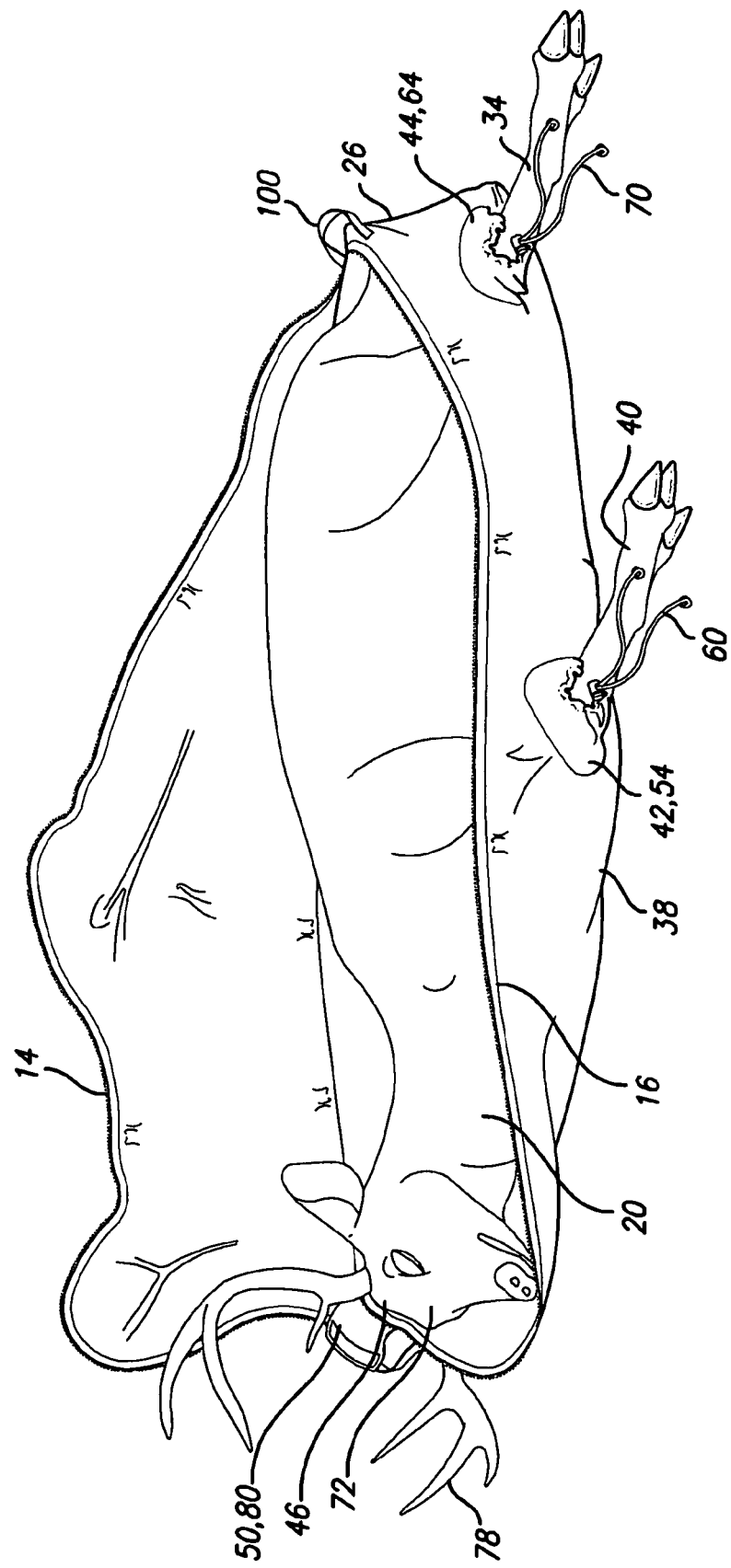
FIG. 6 is a pictorial representation of the dual purpose portable apparatus of FIG. 2 wherein a harvested deer is positioned within a chamber defined by the dual purpose portable apparatus.

The housing 12 is further characterized as having a forward end portion 24 and a rearward end portion 26. A forward gap 28, which will be discussed in more detail hereinafter, is provided by a recess 30 in one or both of the first and second edge portions in the forward end portion 24 of the housing 12, the forward gap 28 being formed when the housing 12 is in a closed position as illustrated in FIG. 1. A first opening 32 is provided near the rearward end portion 26 of the second side 15 of the housing 12, the first opening 32 adapted to receive hind or rearwardly extending legs 34 of the harvested deer 20 when the harvested deer 20 is disposed within the chamber 18 of the housing 12 of the dual purpose portable housing apparatus 10 and the housing is secured in a closed position. In addition, the housing 12 is provided with a second opening 36 in a medial portion 38 of the second side 15 of the housing 12, the second opening 36 adapted to receive fore or forward legs 40 of the harvested deer 20 when the harvested deer 20 is disposed within the chamber 18 of the housing 12 and the housing 12 is in a closed condition as shown in FIG. 6.

To prevent insects, dirt, and the like from entering the chamber 18 of the housing 12 and contaminating the harvested deer 20 disposed therein, the housing 12 is provided with a closure assembly 44 extending about the first opening 32 and about the hind legs 34 when the harvested deer 20 is disposed within the chamber 18 of the housing 12; and the housing 18 is also provided with a closure assembly 42 extending about the second opening 36 formed in the medial portion 38 of the housing 12 so that the second opening 36 can be closed and secured about the fore legs 40 of the harvested deer 20 when the harvested deer 20 is disposed within the chamber 18 of the housing 12.

When employing the dual purpose portable apparatus 10 as a shelter, the closure assemblies 44 and 42 extending about the first and second openings 32 and 36, respectively, can be moved to a substantially closed position to prevent the elements from entering into the chamber 18 of the housing 12 and thus into contact with a person 22 utilizing the dual purpose portable apparatus 10 as a shelter from weather and the elements. As will be described in more detail hereinafter, the dual purpose portable apparatus 10 is provided with at least one flap 50 in the forward end portion 24 of the housing 12 for covering the forward gap 28 and thus prevent the elements from entering into the chamber 18 of the housing 12 and thus into contact with a person 22 utilizing the dual purpose portable apparatus 10 as a shelter. The at least one flap 50 can also cover a crown portion 46 of the harvested deer 20 when the head of the harvested deer is enclosed within the housing 12 substantially as shown in FIG. 1.

Referring now to FIG. 3, the housing 12 is shown in an opened configuration so that the chamber 18 is more clearly shown. As previously stated, the chamber 18 is sized to receive a harvested game animal such as the harvested deer 20, so that the harvested game animal can be readily transported out of the wild to be later processed, for both meat and as a trophy. Because the temperature at the time of harvesting the deer 20 may be sufficient to cause spoilage of the harvested deer 20, bags of ice 52 can be placed in the body cavity of the harvested deer 20 or in various locations of the chamber 18 external to the body cavity of the harvested deer 20, such as near the chest, hind quarters and head area of the harvested deer 20 when the harvested deer 20 is disposed within the chamber 18 of the housing 12. If desired, pouches or netting can be provided within an interior portion of the housing 12 adjacent the chamber 18 so that ice bags 52 or other cooling devices can be positioned therein to assist in maintaining the harvested deer 20 in a cooled condition for transporting from the hunting area.

As previously stated, the first opening 32 of the housing 12 openly communicates with the chamber 18 of the housing 12 and is adapted to receive the hind or rear legs 34 of the harvested deer 20 when the harvested deer 20 is disposed within the chamber 18 of the housing 12; and the second opening 36 of the housing 12 is adapted to receive the fore or forward legs 40 of the harvested deer 20 when the harvested deer 20 is disposed within the chamber 18 of the housing 12. Since the closure assembly 44 is similar in construction to the closure assembly 42, only the closure assembly 42 will be described in detailed hereinafter with reference to FIG. 4.

The closure assembly 42 includes a closeable collar 54 having a distal end 56 and a proximal end 58. The proximal end 58 is secured to the portion of the housing 12 surrounding the second opening 36 by any means known in the art such as sewing and the like. Thus, the distal end 56 of the closeable collar 54 extends a distance outwardly from the second opening 36.

The closeable collar 54 is sized such that it extends along an upper portion of the fore legs 40 of the harvested deer 20 when the fore legs 40 of the harvested deer 20 extend through the second opening 36 and the closeable collar 54 when the harvested deer 20 is disposed within the chamber 18 of the housing 12. The closeable collar 54 can also be adapted in such a way that the distal end 56 of the closeable collar 54 is capable of being reduced in size, for example, by a drawstring 60, to secure the fore legs 40 of the harvested deer 20 extending therethrough in a secured position and to prevent insects and the like from entering the chamber 18 of the housing 12 via the second opening 36 and the closeable collar 54. A restraining member 62 is disposed on the drawstrings 60 in a customary manner so as to prevent the closeable collar 54 from opening once the closeable collar 54 has been secured about an upper portion of the fore legs 40 of the harvested deer 20. The closeable collar 54 can be made of elastic or elastic-like material; however, it should be understood that the closeable collar 54 can be constructed from any material capable of substantially securing the fore legs 40 of the harvested deer 20 disposed within the housing 12 while at the same time preventing insects from intruding the housing 12 via the closeable collar 54 and the second opening 36 of the housing 12.

The rearward end portion 26 of the housing 12 forms the area in which the hind end of the harvested deer 20 is placed when the harvested deer 20 is disposed within the chamber 18 of the housing 12. The rearward end portion 26 can either be unitary in structure with the housing 12 or can be a separate piece of material that is separately connected, for example, by sewing. The first opening 32 in the housing 12 openly communicates with the chamber 18 and is positioned near the rearward end portion 26 of the housing 12 so as to be spatially disposed from the second opening 36 in the housing 12. The closure assembly 44 disposed about the first opening 32 includes a closeable collar 64 (shown best in FIG. 1) having a distal end 66 and proximal end 68. The proximal end 68 of the closeable collar 64 is secured to the housing 12 so that the closeable collar 64 is disposed about the first opening 32 in the housing 12.

As previously stated, the closeable collars 54 and 64 are similar in construction and can be made of any material that is capable of extending along an upper portion of the fore legs 40 and hind legs 34 of the harvested deer 20 which extend through the closeable collars 54 and 64, respectively, when the harvested deer 20 is disposed within the chamber 18 of the housing 12. The distal end 66 of the closeable collar 64 is desirably reducable in size, such as by providing a drawstring 70, so that the closable collar 64 can be secured about hind legs 34 of the harvested deer 20 extending therethrough. As with the closeable collar 54, the closeable collar 64 can be fabricated of any material capable of securing the hind legs 34 of the harvested deer 20 within the closeable collars 64 so as to prevent insects and the like from entering the chamber 18 on the housing 12 via the closeable collar 64.

While the housing 12 of the dual purpose portable apparatus 10 has been shown and described to include the first opening 32 with the closeable collar 64 and the second opening 36 with the closeable collar 54, it should be understood that the housing 12 can be constructed without these openings so that the legs, both hind legs 34 and fore legs 40 of the harvested deer 20, are fully contained within the chamber 18 of the housing 12. In addition, a key feature of the present invention is that when the housing 12 is in the closed condition or configuration, the first edge portion 14 and the second edge portion 16 of the housing 12 are disposed above the first opening 32 and the second opening 36 in the housing 12. This alignment greatly reduces the likelihood that fluids, including, but not limited to, blood, body fluids, melted ice and the like will escape from the housing 12 when the harvested deer 20 is being transported. In one embodiment both hind legs 34 and fore legs 40 of the harvested deer 20 are fully contained within the chamber 18 of the housing 12 and the closeable collar 64 and the closeable collar 54 are actually sewn closed to provide pooling pockets for the fluids to collect when the harvested deer 20 is being transported.

The forward end portion 24 of the housing 12 forms the area in which a head 72 of the harvested deer 20 is placed when the harvested deer 20 is disposed within the chamber 18 of the housing 12. When the housing 12 is in the closed configuration, the forward end portion 24 is provided with a forward gap 28 that is positioned adjacent the crown portion 46 of the head 72 of the harvested deer 20. The gap 28 (best shown in FIG. 9) is formed by one or more recesses 30 in the forward end portion 24 of at least one of the first and second edge portions 14 and 16 when the housing 12 is in a closed configuration. The gap 28 is the only area exposing the head 72 of the harvested deer 20 to the external environment when the housing 12 is in the closed configuration. The forward end portion 24 of the housing 12 can also be provided with recesses 30 such as a pair of circular cutouts 76 for forming the gap 28 and receiving and fitting about antlers 78 of the harvested deer 20.

Figure 7:
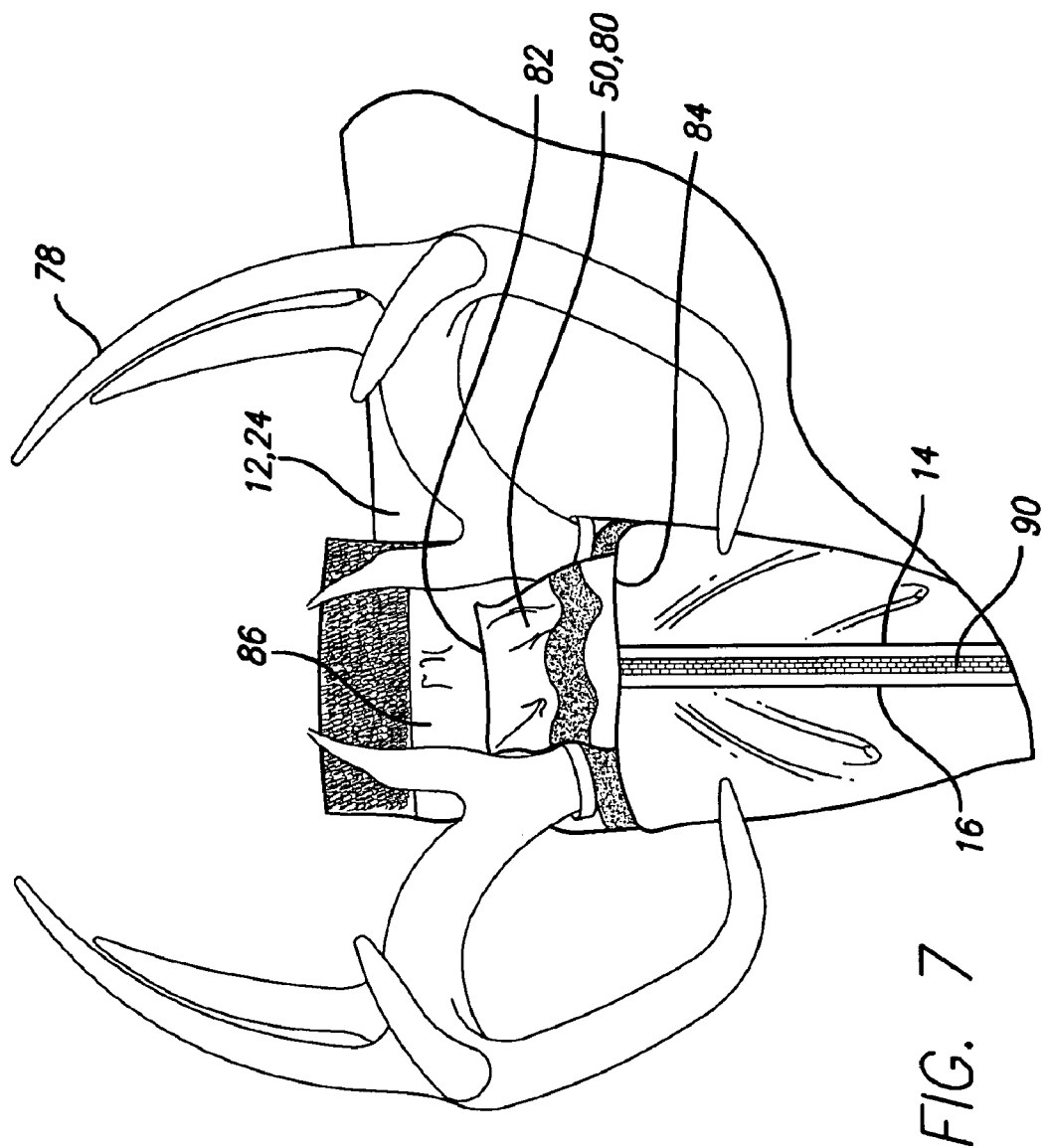
FIG. 7 is a pictorial representation of a forward end portion of the dual purpose portable apparatus of the present invention wherein antlers of a harvested deer supported within the dual purpose portable apparatus extend outwardly to assist in carrying the harvested deer from a hunting area.
Figure 8:
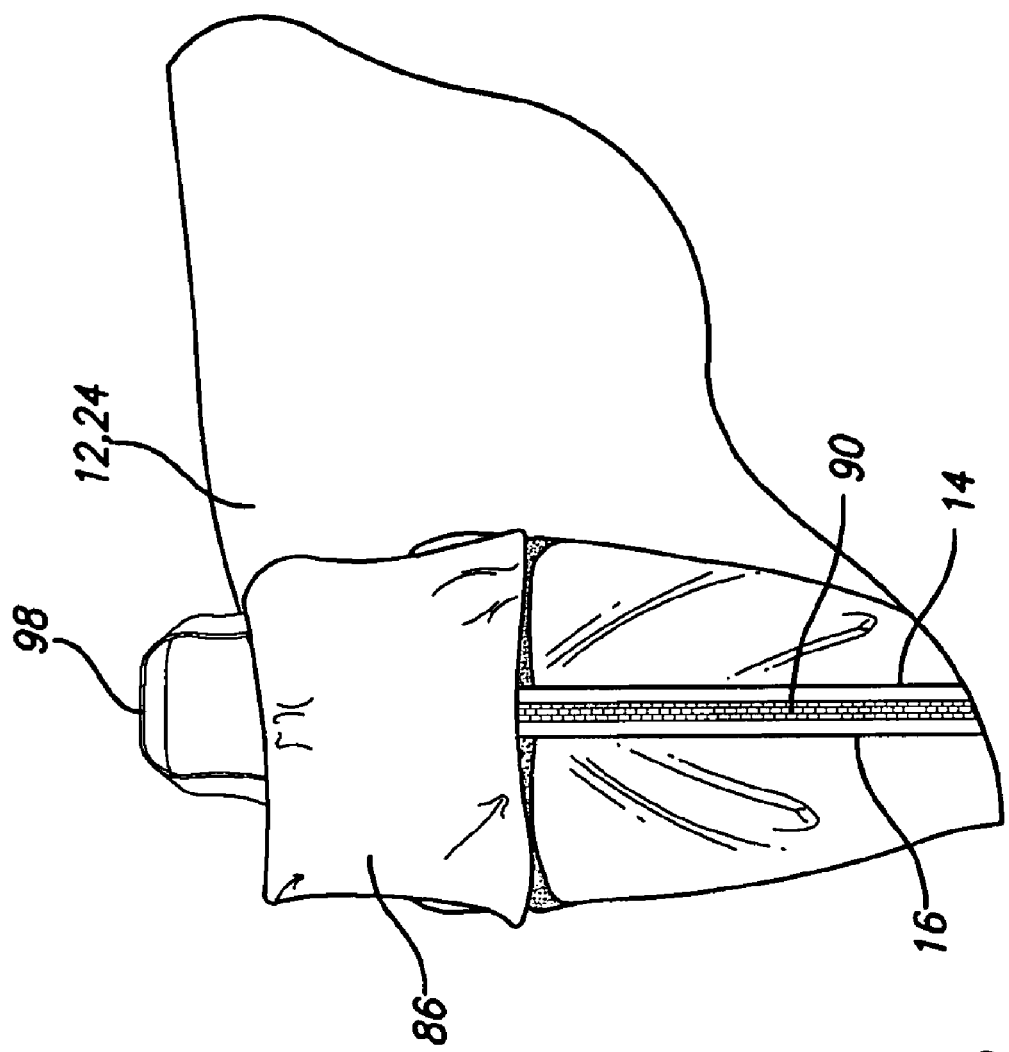
FIG. 8 is a pictorial representation of a forward end portion of the dual purpose portable apparatus of the present invention wherein the dual purpose portable apparatus is in a closed configuration, the harvested game animal is void of antlers, and a handle is supported thereon for assisting in carrying a harvested animal from a hunting area.
Figure 9:
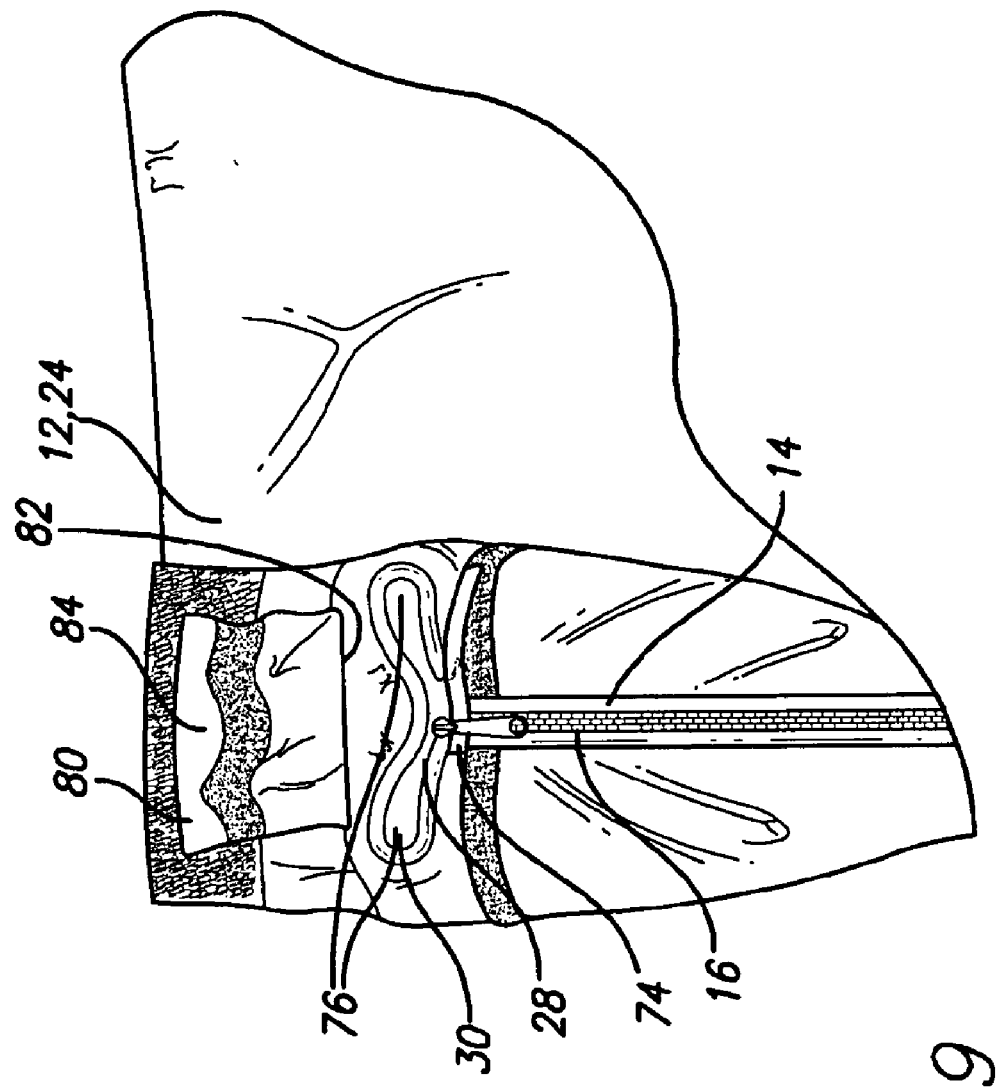
FIG. 9 is a pictorial representation of the dual purpose portable apparatus of the present invention depicting a forward end in a near-closed configuration and illustrating a flap for covering a gap therein adapted to permit horns or antlers of a harvested animal to extend therethrough.
Figure 10:
FIG. 10 is a pictorial representation of the dual purpose portable apparatus of the present invention in a closed condition for carrying a harvested game animal from a hunting location or as a temporary shelter for a person should inclement weather be encountered.

Referring now to FIGS. 7, 8 and 9, the forward end portion 24 of the housing 12 of the dual purpose portable apparatus 10 is more clearly shown. The housing 12 is provided with at least one flap 50, such as flap 80. The flap 80 is provided with a first end 82 and a second end 84. The first end 82 of the flap 80 is connected to the forward end portion 24 of the housing 12 so that the flap 80 is disposable between the antlers 78 of the harvested deer 20 when the antlers 78 are extending through the forward gap 28 of the housing 12. The flap 80 is thus maintained in a stable position that substantially covers the forward gap 28 which exposes the crown portion 46 of the head 72 of the harvested deer 20 when the harvested deer 20 is disposed within the chamber 18 of the housing 12 and the housing 12 is in the closed configuration.

The second end 84 of the flap 80 may be constructed to connect to the housing 12 with the Velcro® type straps, showing, or the like. Alternatively, the forward end portion 24 of the housing 12 can be provided with a second flap 86 which is greater in size than the first flap 80. The second flap 86 is adapted to securely cover the forward gap 28 or the circular cutouts 76 provided in the forward end portion 24 of the housing 12 when the housing 12 is in the closed configuration and the harvested deer has no antlers, i.e., if the harvested deer 20 is a doe. The second flap 86 is connectable using Velcro® or any other mechanism capable of securing the second flap 86 in a secured position so as to cover the forward gap 28 and thus the recesses or circular cutouts 76 when the housing 12 is in the closed configuration.

The housing 12 may also be provided with a number of darts 88 which extend along the first and/or second edge portions 14 and 16 of the housing 12 so that the housing 12 is configured to receive the head 72 and the body portion of the harvested deer 20. Additionally, one or more darts 88 along the second edge portion 16 can provide depth to the housing 12. While the housing 12 has been described as containing a plurality of darts 88, is to be understood that any mechanism known to those skilled in the art can be employed in place of the dart 88 to provide depth to the housing 12.

When the harvested deer 20 is stored in the housing 12 on a horizontal surface, such as the ground or in a car or truck bed, the first edge portion 14 and the second edge portion 16 join at an elevated level. A zipper 90 or other means well known in the art can be used to join the first and second edge portions 14 and 16 in order to prevent leakage of melted ice and body fluids from the harvested deer 20. By configuring the housing 12 with the zipper 90 in an elevated position during storage, leakage of fluids can be minimized. In addition, off-setting the zipper 90 from the first opening 32 and the second opening 36 in the housing 12 reduces difficulty and manufacturing cost compared to designs without such offset.

The housing 12 may be formed from a single layer of fluid-resistant material having an interior surface and an exterior surface, or from multiple layers of material. Referring now to FIG. 5, a cross-sectional view of a portion of the housing 12 is shown, wherein the housing 12 is depicted as being constructed with three distinct layers, namely, an exterior layer 92, an interior fluid-resistant layer 94 and one or more thermal-insulating layers 96 interposed between the external layer 92 and the interior fluid-resistant layer 94 of the housing 12. The exterior layer 92 can be constructed of a foldable flexible material with a camouflage design. However, it is understood in the art that the exterior layer 92 can be any durable, flexible material including but not limited to plastic, fiber, woven fabric and leather. The interior, fluid-resistant layer 94 can be constructed of a reflective material having thermal radiant barrier properties, although any foldable fluid-resistant material will suffice. When reflective material is used, the reflective material can be facing the interior of the housing 12 to reflect body heat back into the housing when using the dual purpose portable apparatus 10 as a survival blanket or as a personal protective shelter. The dual purpose portable apparatus 10 can also be positioned behind a person facing a fire such that the reflective material reflects radiant heat from the fire back toward the person. The reflective material can also be facing away from the interior of the housing 12 to reflect radiant energy from the sun away from the interior of the housing 12. Typically, the interior surface of the fluid-resistant layer or material is easily washed with, for example water, to remove residual fluids such as blood and body fluids from the harvested animal. The fluid-resistant layer or material also prevents cooled air within the housing 12 in the closed configuration from readily exchanging with warm air external to the housing 20. The thermal insulating properties of the thermal insulating layer 96 of the housing 12 permit the harvested deer 20 to be stored at a temperature sufficient to preserve the integrity of the harvested animal's meat (from spoiling) and the head 72 (for use as a trophy). Additionally, a microbial resistant chemical can be disposed on the interior fluid-resistant layer 94 of the housing 12 or the interior surface of any material employed in the construction of the housing 12, depending on whether the housing 12 is constructed of multiple layers as illustrated in FIG. 5 or as a single fluid-resistant material.

In order to assist in carrying the harvested deer 20 disposed within the chamber 18 of the housing 12 from a remote location, the dual purpose portable apparatus 10 is provided with a first handle 98 formed on the forward end portion 24 of the housing 12, and a second handle 100 formed on the rearward end portion 26 of the housing 12. Thus, the second handle 100 cooperates with the first handle 98 attached to the forward end portion 24 of the housing 12 to assist in manual transporting of the harvested deer 20.

As previously stated, the housing 12 has two primary configurations, namely, an open configuration for receiving a harvested animal, such as the deer 20 (FIGS. 1 and 3), and a closed configuration for providing shelter for a person such as a hunter when the person requires a shelter (FIG. 2) or for enclosing the harvested deer 20 disposed within the chamber 18 of the housing 12. The first edge portion 14 of the housing is disposed a distance away from the second edge portion 16 when the housing is in the opened configuration. However, the first edge portion 14 is disposable adjacent to and connectable to the second edge portion 16 when the housing 12 is in the closed configuration by any suitable mechanism such as zipper, straps, Velcro®, and the like. Desirably, the first edge portion 14 and the second edge portion 16 are selectively and reversely connected by a zipper so as to implement the housing 12 between movement from an open configuration to a closed configuration and vice-a-versa. When connected by a zipper, a zipper stop or zipper cover 74 can be used to lock the zipper slider and pull tab in the fully closed position. For example, the zipper cover 74 can be a strap of Velcro disposable across the zipper, adjacent the zipper slider and pull tab in the closed position, and capable of preventing accidental opening of the zipper.

Figure 11:
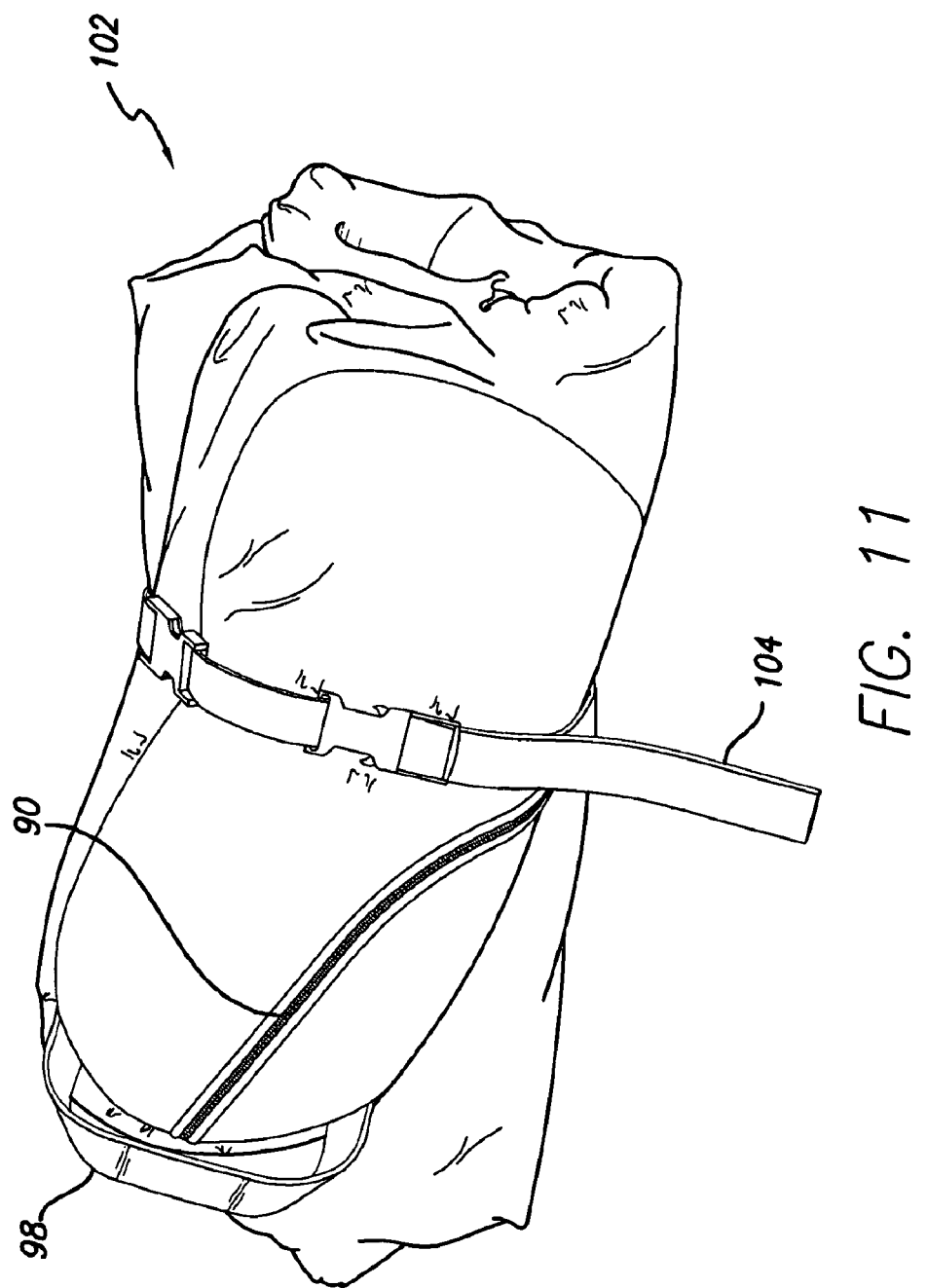
FIG. 11 is a pictorial representation of a dual purpose portable apparatus of the present invention in a rolled compact configuration for transportation by a person.

The housing 12 of the dual purpose portable apparatus 10 is desirably constructed of a flexible material which will enable the housing 12 to be moved to a folded condition for transportation and storage when the dual purpose portable apparatus 10 is not employed for carrying a harvested animal or functioning as a shelter for a hunter. As shown in FIG. 11, the housing 12 can be readily rolled into a roll 102 which is then secured in position by a strap 104. By forming the housing 12 into the roll 102 and securing the roll 102 with the strap 104 into a tight compact shape, the housing 12 is more easily transported and stored.

From the above description, it is clear that the present invention is well adapted to carry out the objects and to obtain the advantages mentioned herein as well as those inherit in the invention. While presently preferred embodiments of the invention have been described for purposes of this disclosure, it will be understood that numerous changes maybe made which will really suggest themselves to those skilled in the art and which are accomplished within the spirit of the invention disclosed.

What is claimed is:

1. A dual purpose portable apparatus for carrying a harvested game animal or for providing a protective shelter for a person, the apparatus comprising a housing formed of a flexible, foldable material defining a chamber therein, the chamber adapted to receive a body and head portion of the harvested game animal or the person seeking shelter therein, the housing comprising:
    a first side having a first edge portion and a second side having a second edge portion, the first edge portion disposable a distance from the second edge portion when the housing is in an open configuration for receiving the harvested game animal or the person, the first edge portion disposable adjacent to and connectable to the second edge portion for enclosing at least a portion of the chamber in a closed configuration when the harvested game animal is disposed therein or the person is positioned therein;
    a first opening positioned near a rearward end portion of the second side of the housing, the first opening adapted to receive the hind legs of the harvested game animal when the harvested game animal is positioned in the chamber of the housing;
    a second opening positioned in a medial portion of the second side of the housing, the second opening adapted to receive the fore legs of the harvested game animal when the harvested game animal is positioned in the chamber of the housing, the first and second edges of the housing disposed above the first and second openings therein when the housing is in a closed configuration so as to substantially retard leakage of fluid through the first and second openings and between the first and second edges of the housing;
    a recess in a forward end of one or both of the first and second edge portions, the recess forming a forward gap in a forward end of the housing when the housing is in a closed configuration, wherein the forward gap allows for protrusion of antlers on the head of the harvested game animal when the harvested game animal is disposed in the chamber of the housing and the housing is in a closed configuration; and
    at least one flap having a first end and a second end, the first end connected to the forward end of the housing whereby the at least one flap is capable of covering the forward gap.

2. The dual purpose portable apparatus of claim 1 wherein the housing material is formed of a substantially fluid-impermeable material capable of providing a liquid holding barrier.

3. The dual purpose portable apparatus of claim 2 wherein the housing material provides sufficient thermal insulation to permit the harvested game animal to be stored therein at a temperature sufficient to preserve the integrity of the harvested game animal's meat from spoiling and to preserve the head of the harvested animal for use as a trophy.

4. The dual purpose portable apparatus of claim 1 further comprising a microbial resistant chemical agent disposed on at least an interior surface of the housing.

5. The dual purpose portable apparatus of claim 1 wherein the first and second edges of the housing are positionable in an upper portion thereof when the housing is in the closed configuration to prevent leakage of fluids from the enclosed harvested animal.

6. The dual purpose portable apparatus of claim 1 wherein the housing further comprises an exterior layer and an internal, substantially fluid-impermeable layer.

7. The dual purpose portable apparatus of claim 6 wherein the internal, substantially fluid-impermeable layer is characterized as having thermal radiant barrier properties.

8. The dual purpose portable apparatus of claim 7 wherein the thermal radiant barrier properties of the internal water-impermeable layer provide sufficient reflection of radiant heat to protect a person when the dual purpose portable storage unit is used as a survival blanket.

9. The dual purpose portable apparatus of claim 6 wherein the housing further comprises at least one thermal insulating layer disposed between the exterior layer and the internal substantially fluid-impermeable layer.

10. The dual purpose portable apparatus of claim 1 wherein the housing is provided with at least one dart positioned so as to provide sufficient depth to the housing to enhance enclosure of the head and body of the harvested animal or person therein.

11. The dual purpose portable apparatus of claim 1 wherein the chamber is of sufficient size to permit ice to be disposed within the chamber when the harvested game animal is enclosed within the chamber of the housing.

12. The dual purpose portable apparatus of claim 1 further comprising a closure assembly for selectively connecting the first edge portion of the housing to the second edge portion of the housing when the housing is disposed in a closed condition.

13. The dual purpose portable apparatus of claim 12 wherein the closure assembly comprises a zipper having male and female components, the male component being attached to one of the first and second edge portions of the housing and the female component being attached to the other of the first and second edge portions of the housing.

14. The dual purpose portable apparatus of claim 1 further comprising a first collar secured about the first opening of the housing, the first collar extendible along an upper portion of the hind legs of the harvested game animal when the hind legs of the harvested game animal extend therethrough whereby the harvested game animal is enclosed within the chamber defined by the housing.

15. The dual purpose portable apparatus of claim 14 wherein a distal end of the first collar is selectively reducible in size so as to secure the first collar securely about the hind legs of the harvested game animal when the hind legs of the harvested game animal extend through the first collar.

16. The dual purpose portable apparatus of claim 14 further comprising a second collar secured about the second opening in the housing and extendible along a portion of the fore legs of the harvested game animal when the fore legs of the harvested game animal extend therethrough whereby the harvested game animal is substantially enclosed within the chamber defined by the housing.

17. The dual purpose portable apparatus of claim 16 wherein a distal end of the second collar is reducible in size such that the second collar is securable about the fore legs of the harvested game animal extending therethrough.

18. The dual purpose portable apparatus of claim 17 wherein the first and second collars are each provided with a drawstring for reducing the distal end of the first and second closeable collars.

19. The dual purpose portable apparatus of claim 17 wherein the first and second collars are each formed of an elastic material.

20. The dual purpose portable apparatus of claim 1 wherein the at least one flap is disposable between the antlers of the harvested game animal positioned within the housing.

21. The dual purpose portable apparatus of claim 20 wherein the second end of at least one flap is detachably connectable to the housing.

22. The dual purpose portable apparatus of claim 20 wherein the at least one flap comprises a first flap and a second flap, the second flap being larger in size than the first flap and wherein the second flap is adapted to cover substantially all of the forward gap when the housing is in a closed configuration and the harvested game animal is void of antlers.

23. The dual purpose portable apparatus of claim 1, further comprising a first handle attached to the forward end portion of the housing, and a second handle attached to the rearward end portion of the housing.

24. The dual purpose portable apparatus of claim 1, further comprising at least one strap, the at least one strap functioning to hold the dual purpose portable storage unit in a tightly rolled, compact shape.

25. The dual purpose portable apparatus of claim 1, further comprising a first collar secured about the first opening of the housing and a second collar secured about the second opening of the housing, wherein a distal end of the first collar and a distal end of the second collar are closed to provide pooling pockets for the collection of fluids from the harvested animal enclosed therein.

* * * * *